United States Patent [19]

Johansson

[11] Patent Number: 4,627,777

[45] Date of Patent: Dec. 9, 1986

[54] ATTACHMENT MEANS

[76] Inventor: Eskil T. Johansson, Sunnanvindsvägen 1, S-58272 Linköping, Sweden

[21] Appl. No.: 609,076

[22] PCT Filed: Sep. 7, 1983

[86] PCT No.: PCT/SE83/00316
§ 371 Date: May 7, 1984
§ 102(e) Date: May 7, 1984

[87] PCT Pub. No.: WO84/00991
PCT Pub. Date: Mar. 15, 1984

[30] Foreign Application Priority Data

Sep. 7, 1982 [SE] Sweden ............................ 8205064

[51] Int. Cl.[4] .............................................. F16B 15/00
[52] U.S. Cl. .................................... 411/439; 411/457; 411/461; 411/469; 411/477; 52/713.
[58] Field of Search ............... 411/457, 469, 477, 456, 411/451, 439, 461, 463, 478; 52/60, 61, 544, 713

[56] References Cited

U.S. PATENT DOCUMENTS

| 941,877 | 11/1909 | Hosch .............................. 411/456 X |
| 991,589 | 5/1911 | Wright .................................. 411/462 |
| 1,087,580 | 2/1914 | Hamill .................................. 411/477 |
| 2,110,959 | 3/1938 | Lombard . | |
| 2,386,887 | 10/1945 | Eckel .................................... 411/457 |
| 2,940,712 | 6/1960 | Lloyd-Young ................. 411/477 X |
| 4,001,993 | 1/1977 | Daniels ......................... 411/478 X |
| 4,167,885 | 9/1979 | Paskert et al. . | |

FOREIGN PATENT DOCUMENTS

| 589088 | 12/1959 | Canada ................................ 411/451 |
| 0014084 | 8/1980 | European Pat. Off. . | |
| 0054177 | 6/1982 | European Pat. Off. . | |
| 113900 | 10/1900 | Fed. Rep. of Germany ........ 52/713 |
| 220276 | 3/1910 | Fed. Rep. of Germany ........ 52/713 |
| 1209813 | 1/1966 | Fed. Rep. of Germany . | |
| 250975 | 11/1926 | Italy ................................... 411/466 |
| 682577 | 11/1952 | United Kingdom ............... 411/478 |
| 1579236 | 11/1980 | United Kingdom . | |
| 489877 | 1/1976 | U.S.S.R. ............................ 411/439 |

Primary Examiner—Gary L. Smith
Assistant Examiner—Rodney M. Lindsey
Attorney, Agent, or Firm—Pollock, Vande Sande & Priddy

[57] ABSTRACT

An attachment means for mounting decorative borders consisting of at least two identical nail-like parts, each part having an elongated section, one end of which gradually narrows and the other end of which forms a member having two trapezoidal-shaped heads. The trapezoidal head parts are separated by a V-shaped notch and are bent at an approximate right angle relative to the elongated section of the part so that the head forms two protruding teeth. The elongated section has a longitudinal bend and a slot which coincides with the bend. The bend, the width of the elongated section, and the width of the slot are mutually matched so that the elongated section of one part can be inserted with a friction fit into the slot of an identical other part. When using the attachment means the elongated section of one part is inserted with friction fit into a pre-bored hole and the teeth are pushed into a border which is then affixed.

3 Claims, 5 Drawing Figures

ATTACHMENT MEANS

BACKGROUND OF THE INVENTION

The present invention relates to an attachment means, especially for decorative borders.

Attachment means made of sheet metal are known through the U.S. Pat. Nos. 2,386,887 and 4,167,885, having more or less the same properties and field of application as conventional wire nails.

A disadvantage with such known attachment means is that they leave marks behind and that the attachment is not acceptable if one tries to use the existing nail holes. A conventionally nailed border can therefore usually not be re-used but must be replaced with a new one. This can cause problems; partly it can be hard to reproduce a border of a certain profile, partly the new border is often not of the same shade and perhaps not of the same patina as the old border.

Another disadvantage is that considerable professional skill is demanded to install a decorative border, especially if the undersurface is concrete.

SUMMARY OF THE INVENTION

The object of the present invention is to achieve an attachment means which can be massproduced at low cost, permits re-usage of decorative borders etc., is easy to use also for amateur carpenters and further allows adjusting before the final attachment.

According to the present invention the attachment means consists of at least two identical nail-like parts, each including an elongated section having a first portion with substantially parallel long sides and a second portion which tapers toward a first end. The elongated section is bent at the center between the parallel sides to form a V-shaped cross-section and is provided with a slot which coincides with the longitudinal bend.

A head member comprising two trapezoidal-shaped head parts, each head part having shorter and longer parallel sides, is attached to the elongated section at right angles thereto and along the parallel sides. The combined length of the long parallel sides is greater than the width of the elongated section and the head member extends outwardly from the elongated section in a direction opposite to the apex of the V-shaped bend. The shape of the bend, the width of the slot and the width of the elongated section are selected to permit insertion of one nail-like part into the slot of another nail-like part with a friction fit.

According to a preferred embodiment of the invention, the edge lines of the notch form a V so that the parts narrow towards the shorter of the parallel sides of the trapezoidal shaped head part, which contributes to the parts penetrating the material of the border.

According to another preferred embodiment the parts are equipped with barbs to improve attachment and to achieve improved fixation of the parts in relation to each other when a combination of two nail-like parts is used.

BRIEF DESCRIPTION OF THE DRAWINGS

In the following discussion the invention will be explained referring to the enclosed drawings where.

DESCRIPTION OF THE PREFERRED EMBODIMENTS

Figure 1A:
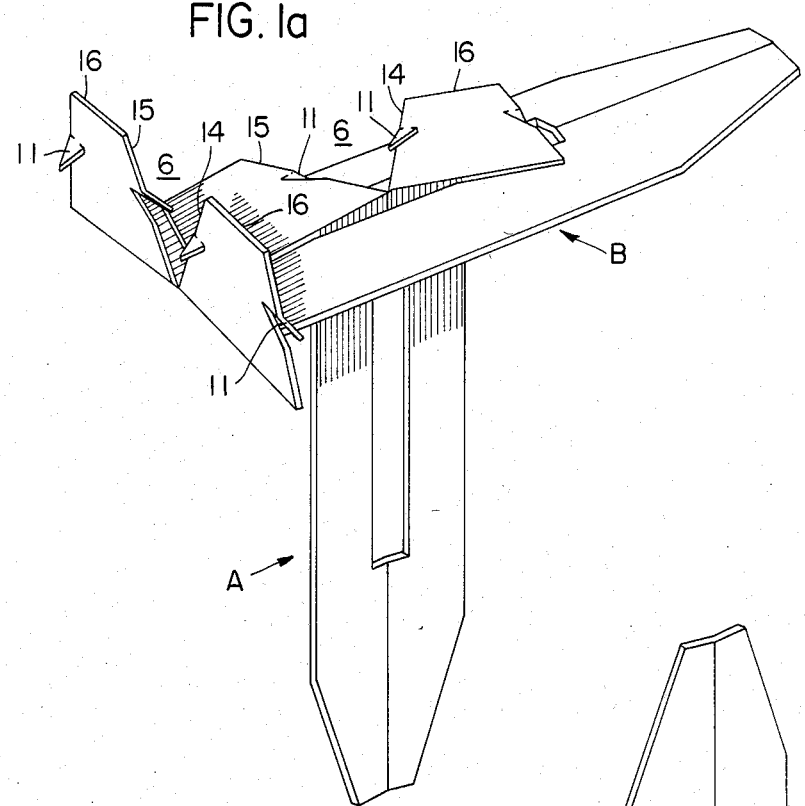
FIGS. 1a and 1b show an embodiment of an attachment means according to the invention from two opposite directions, consisting of two identical nail-like parts.
Figure 1B:
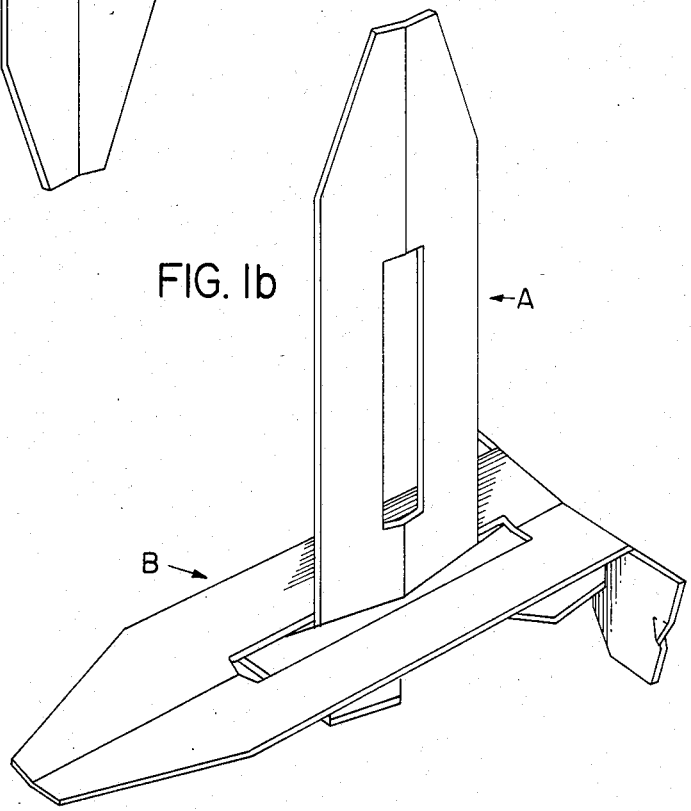
Figure 2A:
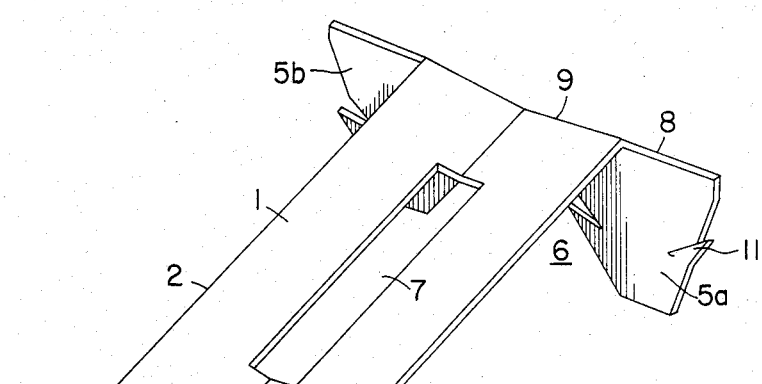
FIGS. 2a and 2b show one such nail-like part from one side and from the opposite respectively.
Figure 2B:
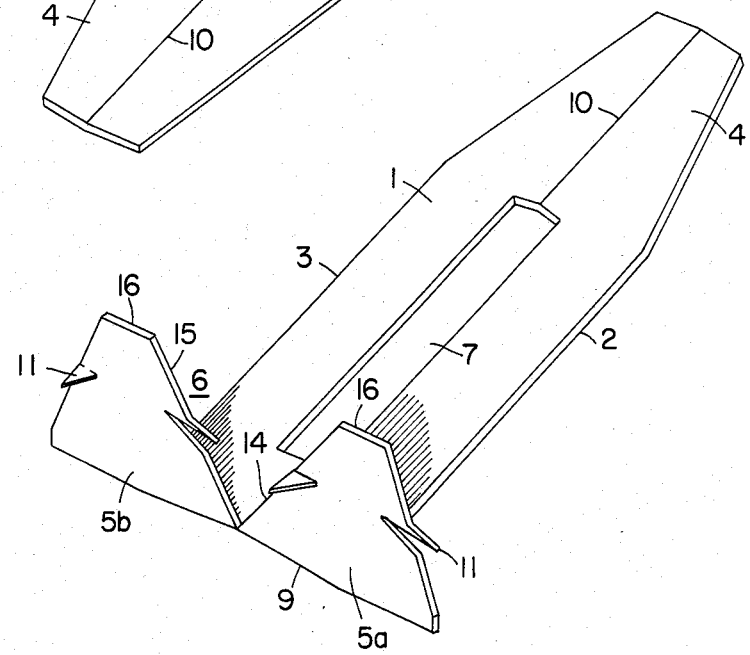

An attachment means according to the invention consists of at least two identical nail-like parts A and B, see FIG. 1. Each nail-like part includes an elongated section 1 having mutually, approximately parallel long sides 2, 3. One end 4 of the section 1 narrows gradually to form the point of the nail-like part. The head, in the other end 5 of the section 1, is bent to create a right angle to the elongated section and is divided into two trapezoidal shaped head parts, 5a and 5b, by a notch 6, the main direction of which is parallel with long sides 2, 3. The head has a width which is larger than the width of the elongated section 1 and is mainly trapezoidal in shape where the longer 8 of the parallel sides of the trapezoidal shaped head parts symmetrically joins to the short side 9 of the elongated section 1. The edge line 14, 15 of the notch forms a V so that the parts 5a, 5b narrow towards the shorter of the parallel sides. Parts 5a and 5b are preferably equipped with barbs the function of which will be explained later.

The elongated section 1 has partly an elongated bend 10 so that its cross-section has a symmetrical V-shape, is provided with a slot 7 which is somewhat longer than the width of the elongated section 1 and coincides with the bending 10. The V-shape of the bend, the width of the elongated section 1 and the width of the slit 7 are mutually matched so that the elongated section 1 of a nail-like part A can be inserted with friction fit into the slot 7 of the other nail-like part B. The elongated section 1 of part A can be telescoped somewhat along the slot 7 of part B at the same time as the opposite edges of slot 7 are engaged with friction fit with the bend 10 and the long sides 2, 3 of part A respectively. One or more of the barbs 11 of this part are engaged with the elongated section 1 of part B and prevent any turning between the parts A and B.

Figure 3:
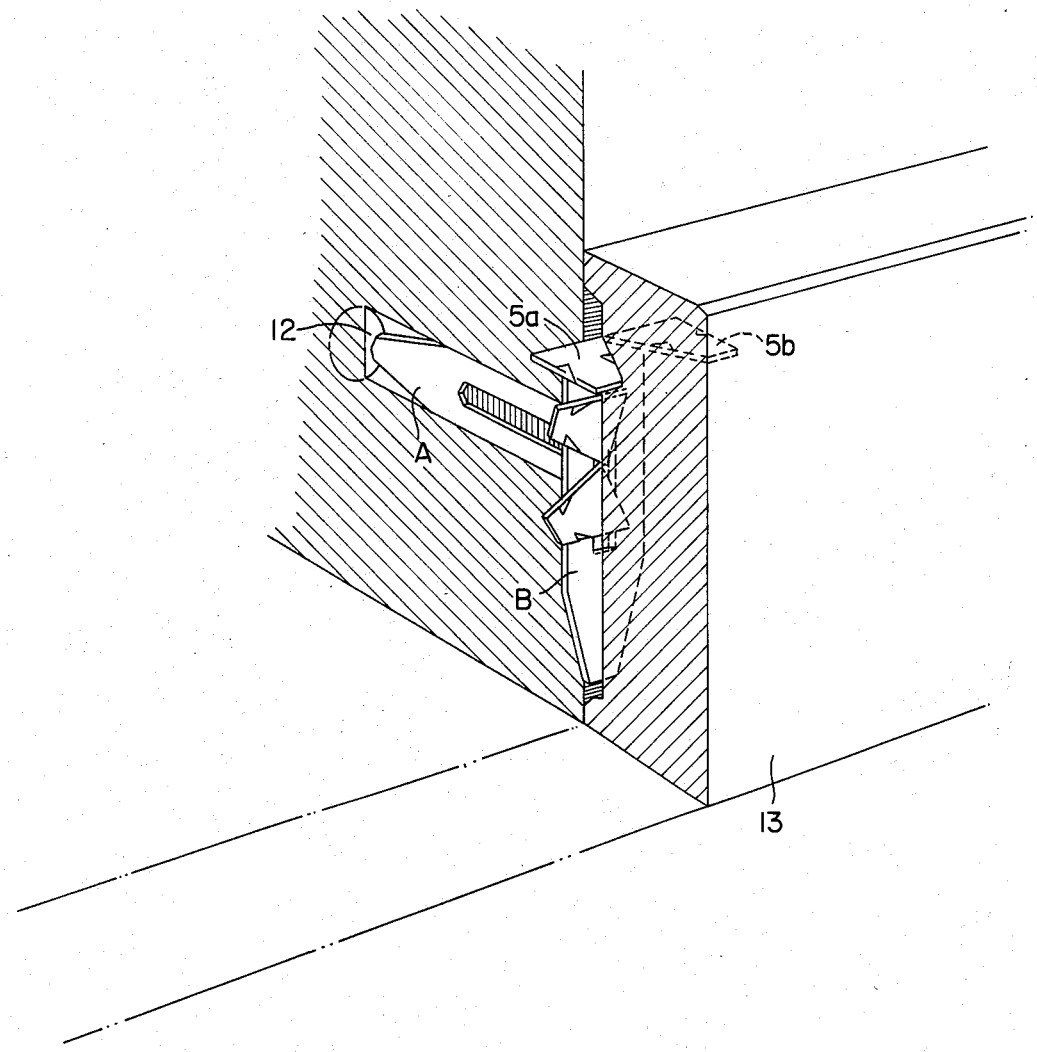
FIG. 3 shows a hidden installation of ceiling or floor border using an attachment means according to the invention.

In a concealed installation of for example ceiling, or floor borders 13, an attachment means comprising two identical parts A, B as shown in FIG. 3 is used. The elongated section 1 of part A is inserted in a pre-bored hole 12 with a diameter chosen so that friction fit is achieved between the walls of the hole 12 and the section 1. The tooth-like parts of 5a and 5b of part B stand out at an approximate right angle from the wall and have been pushed into the border 13. The barbs 11 of the parts 5a and 5b help to improve the attachment. As previously mentioned, the slot 7 is longer than the width of the part 1, the border 13 can therefore be adjusted somewhat upwardly or downwardly after it has been installed to achieve a good connection between the border 13 and either ceiling or floor. The border 13 can also easily be loosened without being damaged and can be re-installed with unchanged strength of attachment.

In the preceding discussion, attachment means consisting of two parts A and B has been described. It is within the scope of the invention to provide another nail-like part with the head turned in the same direction as the point 4 of part B to furthermore improve the strength of the attachment, as another two tooth-like parts 5a, 5b will then be available for the attachment.

I claim:

1. Attachment means comprising at least two identical parts each part comprising:

an elongated section having a first portion with substantially parallel long sides and a second portion which tapers toward a first end, said elongated section comprising a longitudinal bend centered between said long sides so that said elongated section is V-shaped in cross-section;

a head member attached to said elongated section at its second end, said head member comprising two trapezoidal-shaped head parts, each trapezoidal-shaped head part having shorter and longer parallel sides, said head parts being attached to the edge of said elongated section at right angles thereto along said longer parallel sides, said sides being placed next to each other, the combined length of said long parallel sides being greater than the width of said elongated section, said head member extending outwardly from said elongated section in the direction opposite to said V-shaped bend, and a slot in said elongated section having an unobstructed portion, said slot coinciding with said longitudinal bend, and the width of said unobstructed portion of said slot defined perpendicular to the longitudinal bend and the length of said unobstructed portion of said slot defined parallel to the longitudinal bend are selected to allow insertion of one said identical part into the slot of the other said identical part with a friction fit, whereby said long sides of said elongated section of one said identical part and its bend engage the opposite edges of the slot of said other identical part.

2. Attachment means according to claim 1, wherein a V-shaped notch is provided between said trapezoidal-shaped head parts the apex of said V-shaped notch extending toward the longer parallel sides of said trapezoidal-shaped head parts.

3. Attachment means according to claim 1 wherein said trapezoidal-shaped head parts are equipped with barbs turned towards the longer of the said parallel sides of said trapezoidal-shaped head parts.

* * * * *